United States Patent [19]
Moulton et al.
[11] 3,885,130
[45] May 20, 1975

[54] VALUE/USE CONTROL AND IDENTIFICATION SYSTEM FOR MAGNETIC CARDS

[75] Inventors: Eric W. Moulton, Santa Monica; Waldo I. Rogers, Arcadia, both of Calif.

[73] Assignee: Rusco Industries, Inc., Los Angeles, Calif.

[22] Filed: Sept. 4, 1973

[21] Appl. No.: 394,265

[52] U.S. Cl.. 235/61.11 D; 235/61.7 B; 340/149 A; 360/2
[51] Int. Cl. ......................... G06k 7/08; G11b 5/02
[58] Field of Search ................ 235/61.11 D, 61.7 B; 340/149 A; 221/2; 194/4 R, 9 R; 360/2

[56] References Cited

UNITED STATES PATENTS

| | | | |
|---|---|---|---|
| 3,686,479 | 8/1972 | Rogers et al. | 235/61.11 D |
| 3,715,569 | 2/1973 | Hicks et al. | 235/61.11 D |
| 3,743,134 | 7/1973 | Constable et al. | 235/61.11 D |

*Primary Examiner*—Stanley M. Urynowicz, Jr.
*Attorney, Agent, or Firm*—Perry E. Turner

[57] ABSTRACT

A card is spot magnetized with a value or use code, in which the polarities of the spots at one card surface are distributed in accordance with the Gray code in the described arrangement, and with an identification code. Polarity reversing electromagnets with bifilar windings are arranged so that respective spots of the Gray code are aligned therewith. Electromagnet sensors with which each spot of each code are aligned are utilized via logic circuits to cause a clock generator to produce pulses for use in operating end use apparatus and for selectively energizing an electromagnet winding in a direction that reverses the associated spot to establish a decremented value/use code. Successive pulses render operable the sensors and latches connected thereto, the logic circuits for operating the apparatus, a binary down counter to which a converter presents the Gray code in binary form, latches to which the output of the counter is presented in Gray code form, and selector gates for the electromagnets. The logic circuits stop the clock generator to prevent operation of the apparatus and decrementing of the Gray code if the card has either an incorrect identification code or a zero Gray code. A mode switch is shown for permitting normal system operation or for merely verifying the Gray code in the card. Also disclosed is a panel display operable from a clock pulse and from a binary to BCD converter that is connected to the binary down counter, and which exhibits the Gray code as decremented in normal operations or as undecremented in the verify mode of the mode switch.

6 Claims, 3 Drawing Figures

VALUE/USE CONTROL AND IDENTIFICATION SYSTEM FOR MAGNETIC CARDS

BACKGROUND OF THE INVENTION

1. Field of the Invention.

This invention relates to systems for reading and changing codes of spot magnetized cards.

2. Description of the Prior Art.

Spot magnetized cards have been described wherein magnets are poled perpendicular to the card surfaces with polarities distributed to represent a given value, and for which polarities are to be removed with each use to represent a lower value, e.g., as for magnetic cards used as transit fare tickets. Spot magnetized cards are also known which have a fixed code that is identifiable with particular apparatus to be actuated thereby, e.g., parking lot gates. So far as is understood, however, no static reader-recoding system exists for cooperably relating both identification and value/use codes in the same card so that normal operations of associated control circuits are mutual prerequisites for actuating end use apparatus and changing the value/use code, or wherein the value of a card can be verified without effecting operations of either the end use apparatus or the code changing means.

SUMMARY OF THE INVENTION

This invention embraces means for reading respective codes in a spot magnetized card, and means for changing one of codes only if the other code is a predetermined pattern of spots. Also embraced is means for actuating end use apparatus only when the code to be changed represents non-zero of a predetermined code pattern. Further, this invention embraces means for exhibiting the first-mentioned code as changed, and means for controlling the exhibiting means so as to display and verify such code without change and simultaneously preventing operation either of the end use apparatus or the code changing means.

DESCRIPTION OF ILLUSTRATIVE EMBODIMENT

Figure 1:
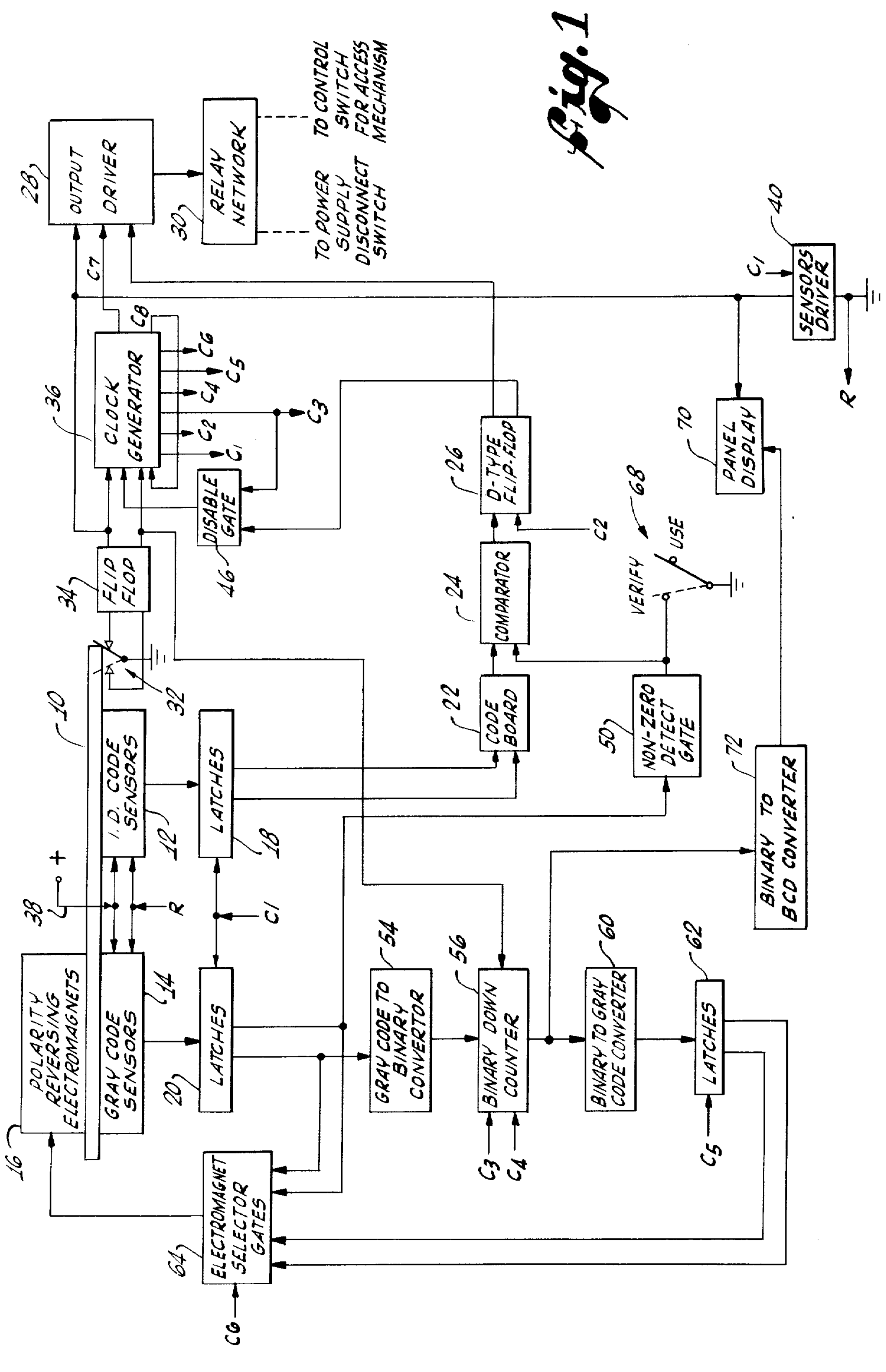
FIG. 1 is a block diagram of a system in accordance with this invention.

Referring to FIG. 1, a magnetic card 10 is adapted to be inserted in the slot of a housing (not shown) in a conventional manner. The card 10 is spot magnetized at a plurality of locations so that the poles of the spots are perpendicular to the card faces. When the card is fully inserted, each such spot is aligned with a respective sensor, which preferably is of the type having a coil wound on a core of saturable material of high initial permeability that requires a very low magnetomotive force to saturate it, e.g., as disclosed in U.S. Pat. No. 3,686,479, assigned to the same assignee as the present application. When such a coil is pulsed, the voltage across it has one characteristic where the coil and spot fields that are aligned are in aiding relation, and another characteristic where such fields are in opposing relation.

In FIG. 1, one set of sensors is designated as identification code (I.D. code) sensors 12, and with which are aligned the spots in the card 10 which have their adjacent poles distributed in accordance with a predetermined identification code. The remaining sensors are designated as Gray code sensors 14, and with which the adjacent poles of the spots in the card are distributed in accordance with the Gray code. All of the sensors 12, 14 function in the same manner. However, for each successive use of the card 10, the sensors 14 detect a different polarity distribution of the spots aligned therewith.

To this end, the spots aligned with the sensors 14 are also aligned with respective polarity reversing electromagnets 16. Upon each insertion of the card, the system of the invention is adapted to energize one of the electromagnets 16 to reverse the polarity of the associated spot, and thereby make the polarity distribution of the Gray code spots conform to the next succeeding value of the Gray code.

In this latter regard, the card 10 is initially spot magnetized in accordance with the Gray code that represents the number of uses allowed the customer. For example, the initial Gray code may represent fifty uses. Upon the first use of the card, the sensors 14 detect the Gray code for 50, whereupon the system functions to change the polarity of one of the spots by energizing the appropriate one of the electromagnets 16, so that the card upon being withdrawn has spots distributed therein to conform to the Gray code representing 49. When the card is inserted for its last use, the same operations take place to make the spot distribution conform to the zero Gray code.

Of course, different customers may have different Gray code spot distributions in their cards. However, whatever the Gray code, the electromagnets 16 are selectively controlled so that the particular polarity distribution is changed in accordance with a one bit decrement of the Gray code represented thereby. In all such cards, however, the I.D. code is the same, and remains so. Thus, only those cards having the same I.D. code can be used in any given facility or type of apparatus.

The sensors 12, 14 are connected to respective latches, which for purposes of convenience of description are grouped as latches 18 to which the I.D. code sensors are connected, and a group of latches 20 to which the Gray code sensors are connected. In one form, each latch is a logic circuit adapted to be enabled, and which provides complement outputs whose logic levels correspond to the polarity of the associated card spot, e.g., relatively high and low voltages ("1" and "0") for a south pole, and relatively low and high voltages ("0" and "1") for a north pole.

The latches 18 are connected to a code board 22, which may be a simple wiring board. In one example, such a board is comprised of a printed circuit board with two sets of terminals, with the two outputs of each latch being connected to respective terminals in each set. Such sets of terminals are interconnected via printed wiring, and via a connector the code board is connected to a comparator 24, which may be a multiple input AND gate. The output of the comparator 24 is connected to a logic circuit, such as the data input terminal of a D-type flip flop 26. The data output terminal of the flip flop 26 is connected to and adapted to enable an output driver network 28 for operating desired apparatus, as through a relay network 30.

When the card 10 is fully inserted, its inner end actuates the movable contact of a single pole, double throw switch 32 having its fixed contacts connected to a flip flop 34. This action initiates operation of a clock generator 36 which produces a succession of clock pulses for effecting system operations to be described, and which resets itself with the last pulse of the train. In the arrangement shown in FIG. 1, the clock generator 36 has output leads C1, C2, C3, C4, C5, C6, C7, C8, and clock pulses appear successively in such leads, the last of which is shown connected to the input of the generator. The clock generator may be formed of conventional pulser and counter circuits.

The C1 clock is used to effect pulsing of the coils of the sensors 12, 14, and to enable the latches 18, 20. Each sensor coil is connected at one end to a voltage source, as indicated at 38. Their remaining ends are connected to the output of a sensors driver network 40, the inputs of which are connected to one output of the flip flop 34 and the C1 lead from the clock generator 36. Upon occurrence of the C1 clock, the sensor coils are provided with completed paths from the positive voltage terminal at 38 to the output of the driver 40, which is at reference or ground potential as indicated at R. The driver 40 may be comprised of one or more NAND function integrated circuits that are commerically available.

With the latches 18 enabled by the C1 clock, a valid identification code in the card 10 is detected via the logic levels of voltages from the coil sensors and latches 18, and results in all of the associated inputs to the comparator 24 are reflected in a high logic level at the data input terminal of the D-type flip flop 26. A clock input terminal of the flip flop 26 is connected to the C2 clock lead from the clock generator 36. Upon the occurrence of the C2 clock, the data output terminal of the flip flop 26 enables the output driver 28 so that it will operate the relay network upon the occurrence of the C7 clock.

If the identification code in the card is invalid, the spot or spots of incorrect polarity are reflected via the comparator 24 in a low voltage level at the data input terminal of the flip flop 26. In such case, the output driver 28 will not be enabled upon occurrence of the C2 clock. Further, the pulse source in the clock generator 36 is disabled in such event. As shown, a disable gate 46 has one input connectted to the complement of the data output terminal of the flip flop 26, and an input connected to the C3 clock lead from the generator 36. When the data output terminal of the flip flop 26 is low, its complement is high, and in such case the C3 clock results in both inputs of the disable gate 46 being high, whereupon such gate is enabled to cause the pulse source in the generator 36 to cease operation. The system ceases to function, and the card must be removed in order to condition the system for further operation.

In this latter regard, removal of a card permits the switch 32 to return to its normally biased condition. The accompanying movement of the movable contact from one fixed contact to the other results in the appropriate lead of the flip flop 34 (the lower output lead in the illustrated arrangement) going low and clearing the counter in the clock generator 36.

The operations above described for a card having a valid identification code are in the context that the Gray code in the card is other than zero. As will be seen, even though the identification code of a card is valid, the system will be disabled as just described if the Gray code is zero. For this purpose, each of the latches 20 has a connection to a respective input terminal of a gate designated as a non-zero detect gate 50, such gate having an output connection to an input terminal of the comparator 24. Assuming that a south pole of a card spot confronting a Gray code sensor represents "1" and the north pole of a spot confronting such a sensor represents "0", a zero Gray code is reflected when all spot polarities confronting the sensors 14 are north poles. In such event, all inputs to the gate 50 from the latches 20 are low, and the input to the comparator 24 from the gate 50 is low. The comparator operates to make the data input terminal of the flip flop 26 low, and the same operations previously described for an invalid identification code take place upon the occurrence of the successive clocks C2 and C3. As before described, removal of the card reconditions the system for further operation.

For a card having a valid identification code and a Gray code representing any number, the system functions to decrement the Gray code in the card by one. To this end, each of the latches 20 has an output connection (the complements of the connections to the non-zero detect gate 50) to a Gray code to binary converter 54. The binary output of the converter 54 is applied to a binary down counter 56. As with the counter means in the generator 36, the binary down counter 56 is cleared via the flip flop 34 in the normal position of the switch 32.

The C3 and C4 clock leads from the generator 36 are connected to the binary down counter 56. The C3 clock causes the binary output of the converter 54 to be loaded into the counter 56, and the next succeeding clock C4 operates the counter so that it counts down by one. The down counted binary output of the counter 56 is applied to a binary to Gray code converter 60, the output terminals of which are connected to respective latches 62. The next succeedidng clock C5 is applied to the latches 62 to cause the Gray code from the converter 60 to be loaded into the latches 62. As will now be seen, the Gray code inserted in the latches 62 is decremented by one with respect to the Gray code in the latches 20.

The complement output terminals of each of the latches 20, 62 are connected to electromagnet selector gates 64 which are operably connected to the polarity reversing electromagnets 16. The C6 clock lead from the generator 36 is connected to the selector gates 64, and upon occurrence of the C6 clock one of the gates 64 is enabled to operate the one of the electromagnets that is needed to reverse the polarity of the Gray code spot which causes the spot polarity pattern to conform to the decremented Gray code.

The next succeeding clock C7 is applied to the output driver 28, which also has an input connected to the flip flop 34. The C7 clock appears after the identification code is detected as valid and the Gray code in the card is decremented, whereupon operation of the driver 28 and relay network 30 causes the desired end use apparatus to function. For example, the relay network is illustrated as adapted to operate a control switch for an access mechanism. The C8 clock then stops the pulser in the clock generator 36.

In addition to the foregoing, the system of the invention is adapted to verify the number of uses remaining for any such card. For this purpose a mode switch 68 is shown with fixed contacts labeled "verify" and "use", the latter being a dead contact and the former being connected to output of the gate 50, and hence to the same input of the comparator 24. The movable contact of the switch 68 is grounded, and is moved against the "verify" contact before the card is inserted. When the card is inserted, this position of the switch 68 effects the same sequence of operations as previously described for the situation of a zero Gray code.

However, while the system ceases after the fashion described, i.e., upon the occurrence of the C3 clock, the number of uses remaining in the card is exhibited by a panel display 70. Such display may be conventional multi-digit displays operable from logic circuits adapted to provide outputs thereto in binary coded decimal form. A connection is shown to the panel display 70 from the same output of the flip flop 34 as that to which the output driver 28 is connected, such connection being effective to reset the display logic circuits. A binary to BCD converter 72 is connected between the binary down counter and the panel display. Since the C3 clock appears and is applied to the binary down counter 56, but the C4 clock does not, the output of the binary down counter upon occurrence of the C3 clock is the same as its input. Accordingly, the binary to BCD converter 72 causes the panel display to exhibit the BCD of the binary form of the Gray code presently in the card.

Figure 2:
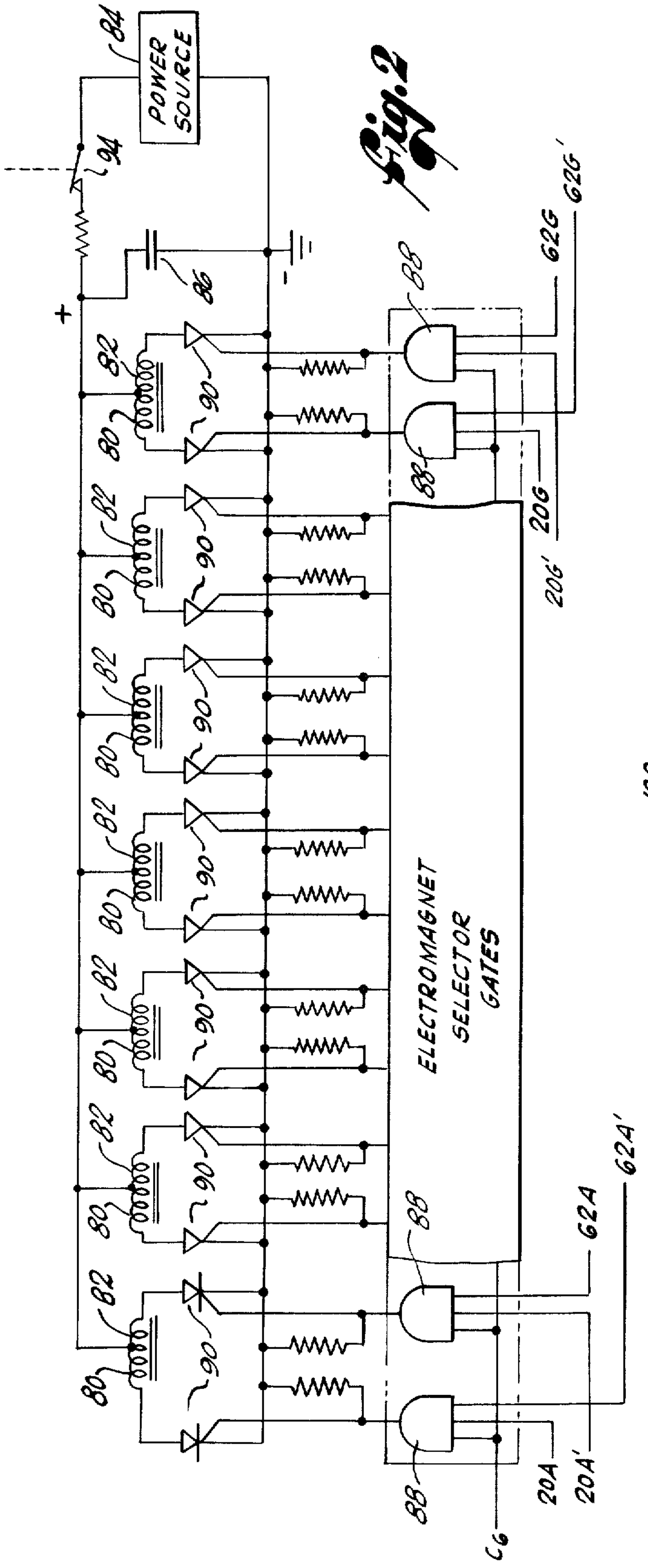
FIG. 2 is schematic diagram of the electromagnets and selector gates of FIG. 1, showing SCR devices through which to effect selective energization of an electromagnet upon an associated gate having respective high inputs from the respective pre-conversion and post-conversion latches.

FIG. 2 illustrates a circuit arrangement of the polarity reversing electromagnets 16 and selector gates 64 for a 7-bit Gray code. Each electromagnet has a pair of coils 80, 82 wound on the same core, preferably as bifilar windings each encompassing the length of the core. The coil windings are joined at one end and connected to the positive terminal of a power supply, illustrated as a power source 84 adapted to charge a capacitor 86. The remaining ends of the coils 80, 82 are adapted to be connected to ground via respective gates 88 and rectifier devices 90 controlled by such gates.

The gates 88 are shown are AND gates having enabling leads connected to the C6 clock lead of the clock generator 36 of FIG. 1. For the gates 88 associated with each pair of coils 80, 82, complement outputs from the latches 20, 62 are connected to respective inputs of such pair. For the pair of gates shown at the left in FIG. 2, leads 20A, 20A' represent the complement outputs of one of the latches 20, and leads 62A, 62A' represent the complement outputs of one of the latches 62. The seventh pair of gates 88 at the right in FIG. 2 have leads 20G, 20G' for complement outputs of a seventh one of the latches 20, and leads 62G, 62G' for complement outputs of a seventh of the latches 62.

When all inputs to a gate 88 are high, the controlled rectifier 90 coupled to it is made conductive to provide a path to ground through the associated electromagnet coil. The coil is thus energized via the charge on the capacittor 86 and in a direction to reverse the polarity of the card spot with which the electromagnet is aligned. The logic levels of the leads 20A–20G represent the Gray code presently in the card, and the logic levels of the leads 62A–62G represent the decremented Gray code.

By way of example, assume that the Gray code present in the card represents the number 49, for which the Gray code is 0101001 and spot poles confronting sensors 20 have the pattern NSNSNNS. In correspondence with the bit positions, the 20A input to the extreme left gate 88 is high, and the 20A' input to the second gate is low; and continuing to the last pair of gates 88, and 20G input to the next to last gate is low and the 20G' input to the last gate is high.

Since the Gray code per the outputs of latches 62 represents the number 49, i.e., 0101000 in Gray code, the 62A' input to the extreme left gate is high and the 62A input to the second gate is low. Following the logic table for the Gray code, it will be observed that the inputs to each of the remaining gates 88 from latches 20, 62 are of different logic levels. Thus, since the inputs to the second gate of the first pair are both low, and the inputs to the first gate thereof are all high, the coil 80 of the first electromagnet is energized via conduction of its SCR. Such coil as wound causes the electromagnet to reverse the polarity of the card spot aligned therewith. Thus, the spot pattern in the card is of poles confronting the Gray code sensors in the order NSNSNNN corresponding to the decremented Gray code 0101000.

A normally closed switch 94 in circuit with the power supply is adapted for operation by the relay network 30 of FIG. 1. A relay in such network functions when energized to open the switch 94 whereby to permit the operative electromagnet to be completely deenergized and the associated SCR to recover. When the card is removed and the relay deenergized, the switch 94 closes to permit the capacitor 86 to be recharged and readied to energize the electromagnet that must be operated for decrementing the Gray code of the next card inserted.

The same power supply may be used to provide the substantial power needed for an electromagnet for reverse polarizing a card spot, and the various relatively small voltages as needed for the sensors and circuits within the clock generator, binary to BCD converter and elesewhere in the system. Such requirements may be met by any known means, e.g., a low voltage A-C source and suitable doubler and rectifier circuits.

Figure 3:
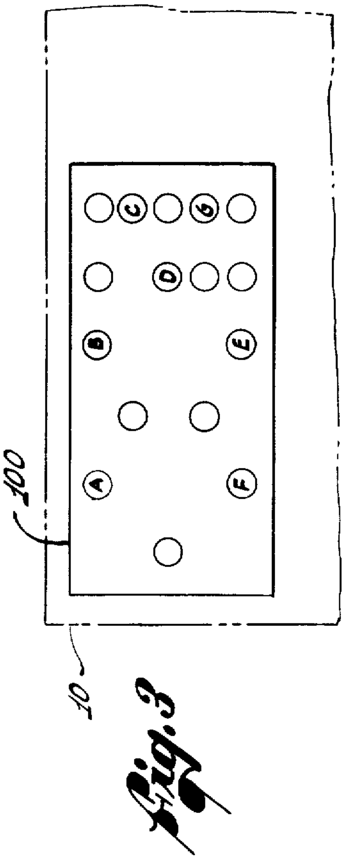
FIG. 3 is a plan view of a magnetic sheet illustrating an example of spot patterns for the value/use code and identification code.

While the sensors are indicated in FIG. 1 to be grouped separately, it is preferred for security purposes that they be at least somewhat intermingled. Similarly, the card spots are mingled for the Gray code and identification code. For example, FIG. 3 shows a card 10 which is formed of plastic in which a magnetic card or sheet 100 is embedded. The lettered spots A–G are those used for a 7-bit Gray code, and the remaining nine spots are magnetized areas for the identification code. The latter spots are coded differently for each facility. If desired, the spots for either or both codes may be in different positions in cards used at different facilities, and in such cases the sensors, as well as the electromagnets, are fixed so the spots will align with then when inserted in the housing.

We claim:

1. In combination:

first and second groups of like stationary electromagnet sensors with which respective magnetized spots of a card are aligned in a stationary position of the card, wherein each spot is magnetized perpendicular to the card faces, wherein the spots associated with the first group of sensors have polarities distributed in accordance with an identification code and the spots associated with the second group of sensors have polarities distributed in accordance with a value/use code that represents a number of uses for the card;

respective stationary polarity reversing electromagnets for the value/use code spots, the value/use code spots being aligned with respective polarity reversing electromagnets in the stationary position of the card;

first means coupled to the sensors of the the first group for developing signals representing the identification code;

second means coupled to the sensors of the second group for developing signals representing the value/use code;

third means coupled to said second signal developing means for developing signals representing a predetermined smaller number of uses for the card;

means for coupling said polarity reversing electromagnets to said third signal developing means for operating said polarity reversing electromagnets to change the polarity distribution of the associated spots so they represent the predetermined smaller number of uses for the card;

a switch operable by the card when it is placed in its stationary position;

control means to which said switch is connected to be rendered operable when the switch is operated by a card, said control means including means for simultaneously rendering said first and second signal developing means operable;

and means for inhibiting operation of said coupling means when said first signal developing means develops signals that do not represent the identification code and for inhibiting operation of said coupling means when said second signal developing means develops signals that represent a zero value/use code.

2. The combination of claim 1, wherein the sensors are electromagnetic sensors adapted to be pulsed for developing respective voltages of levels representing the logic of the polarity distributions of the spots aligned therewith;

and timing signal generating means in said control means for pulsing said sensors, said generator means being activated by operation of said switch, and said inhibiting means disabling said generating means when the signals from said first signal developing means do not represent the identification code or the signals from said second signal developing means represent a zero value/use code.

3. The combination of claim 2, wherein each polarity reversing electromagnet has bifilarly wound coils on a core, each coil being connected at one end of an energizing source and at its other end to a unidirectionally conductive device, and said coupling means for said polarity reversing electromagnets being operable to effect conduction of any unidirectionally conductive device and energization of the associated electromagnet so as to change any spot polarity as needed to establish the polarity distribution that represents the smaller number of uses of the card.

4. The combination of claim 3, wherein the value/use code is the Gray code, and wherein the means for developing signals representing the smaller number of uses for the card includes a Gray code to binary converter coupled to the means for developing signals representing the Gray code;

a binary down counter coupled to said Gray code to binary converter;

and a binary to Gray code converter coupled between the counter and said coupling means for said polarity reversing means.

5. The combination of claim 4, including multi-digit display means;

and means for operating said display means for exhibiting a visual display of the number of uses encoded in the card, including a binary to BCD converter connected to said display means from the binary representation of the Gray code.

6. The combination of claim 5, wherein said binary to BCD converter is connected to said display means from said binary down counter, said timing signal generating means being adapted to supply a first timing signal to said binary down counter to cause the outptut of the Gray code to binary converter to be loaded into said counter, and a subsequent timing signal to said binary down counter to cause said counter to count down, said inhibiting means disabling said generating means after said first timing signal and before said subsequent timing signal when the signals developed from the first group of sensors do not represent the identification code or the signals developed from the second group of sensors represent a zero Gray code.

* * * * *